G. FALCHI.
DRYING APPARATUS FOR ALIMENTARY PASTES.
APPLICATION FILED MAY 8, 1911.
1,050,117.
Patented Jan. 14, 1913.
2 SHEETS—SHEET 1.
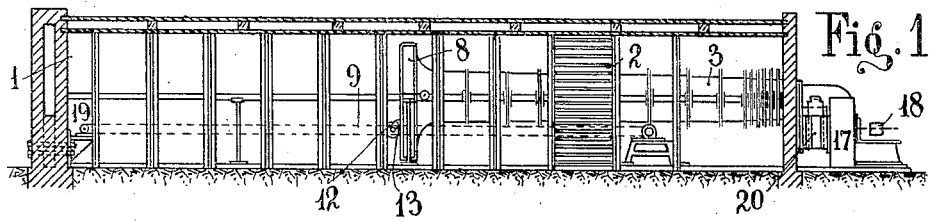
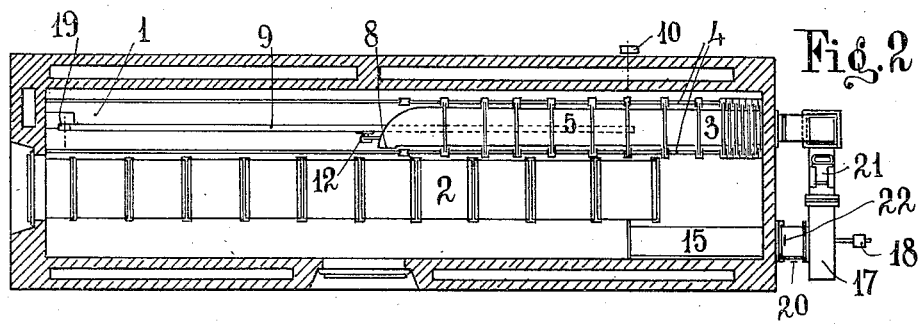
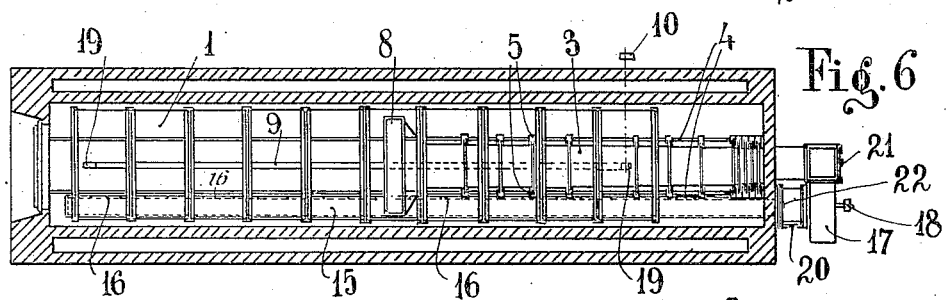
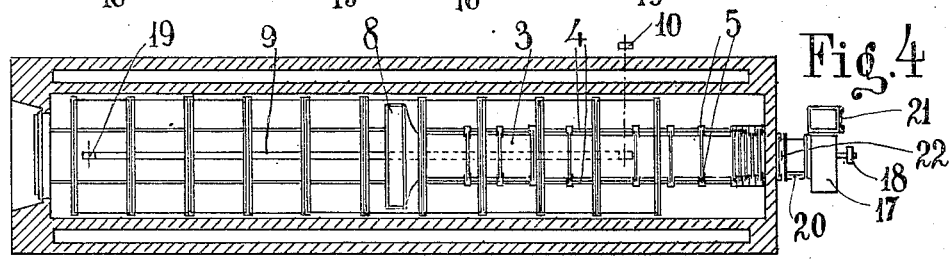
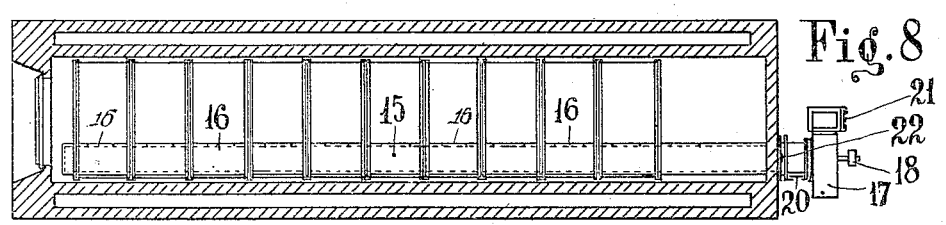
Witnesses:
B. Sommers
Elizabeth Leckert.
Inventor:
Giovanni Falchi
By Henry Orth
Atty.

G. FALCHI.
DRYING APPARATUS FOR ALIMENTARY PASTES.
APPLICATION FILED MAY 8, 1911.
1,050,117.
Patented Jan. 14, 1913.
2 SHEETS—SHEET 2.
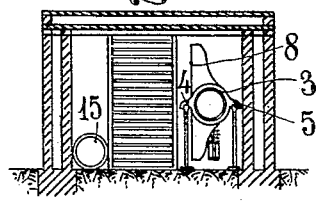
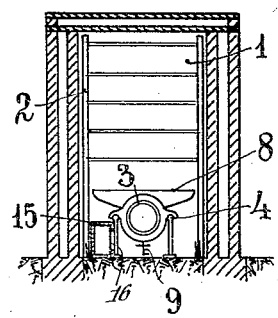
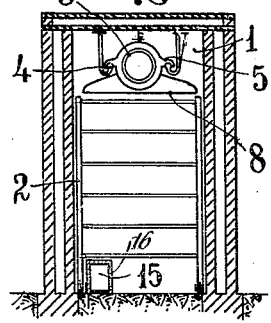
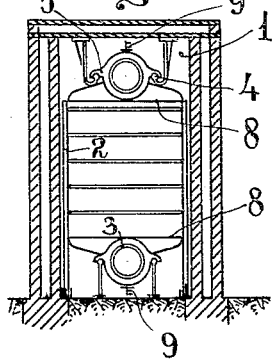
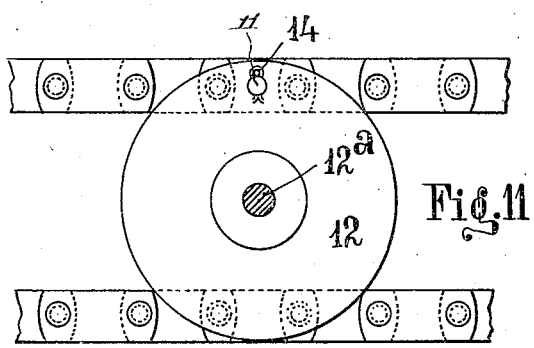
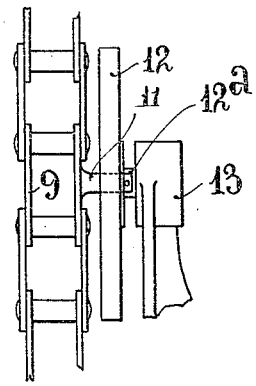
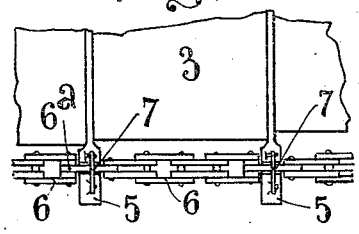
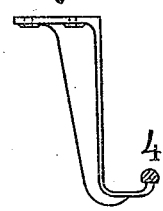
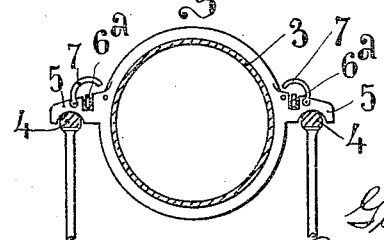
Witnesses:
B. Dommers
Elizabeth Leckert
Inventor:
Giovanni Falchi
By Henry Orth
Atty.
COLUMBIA PLANOGRAPH CO., WASHINGTON, D. C.

UNITED STATES PATENT OFFICE.

GIOVANNI FALCHI, OF BIELLA, ITALY.

DRYING APPARATUS FOR ALIMENTARY PASTES.

1,050,117.  Specification of Letters Patent.  Patented Jan. 14, 1913.

Application filed May 8, 1911. Serial No. 625,921.

*To all whom it may concern:*

Be it known that I, GIOVANNI FALCHI, a subject of the King of Italy, and resident of Biella, Italy, have invented certain new and useful Improvements in Drying Apparatus for Alimentary Pastes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in the drying apparatus forming the subject of my prior U. S. Patent No. 989,137, dated April 11, 1911.

Said improvements consist chiefly in a novel arrangement and construction of the telescoping tubes through which air is forced into the drying apparatus and in the driving mechanism therefor, as well as in a novel arrangement of the suction tubes, the latter being in certain cases advantageously held in fixed position.

In the improved drying apparatus forming the subject of the present invention, the same air is caused to circulate for a certain time inside the drying apparatus and is changed only at suitable periods of time, as will be hereafter described. Said air may be previously heated or not, according to the place, time of the year and hygrometric state of the atmosphere.

The accompanying drawings illustrate several constructional forms of the drying apparatus, in which for more simplicity, the heating apparatus have been omitted. The latter may be identical or similar to those described in my prior patent above referred to.

Figure 1 is a longitudinal section of one form of drying apparatus embodying my invention. Fig. 2 is a plan view thereof. Fig. 3 is a transverse section thereof. Fig. 4 is a plan view of an improved drying apparatus for alimentary pastes of the elongated form, and the like. Fig. 5 is a transverse section thereof. Fig. 6 is a plan view of a similar drying apparatus with a modified arrangement for the circulation of the air. Fig. 7 is a transverse section thereof. Fig. 8 is a plan view of a similar drying apparatus with a further modified arrangement of the air circulation. Fig. 9 is a transverse section of same. Fig. 10 is a detail top view of the chain and driving mechanisms for imparting a to and fro movement to the telescoping tubes. Fig. 11 is a detail side view thereof. Figs. 12 and 13 are detailed views of the means for supporting the tubes on their guides and of their chain joint. Fig. 14 is a detailed view of a modified form of the guides for the telescoping tube with its support when the telescoping tube is situated at the upper part of the drying chamber.

In the constructional form shown at Figs. 1, 2 and 3, 1 designates the drying chamber that may be lined with brick-work, wood or any other suitable material, preferably with the interposition of the well known insulating air space. At the central part of said chamber and all along the same are placed the usual paste racks or carriages 2. Laterally of these latter and at about half their height, a telescoping tube 3 is provided, each element of which is slidably supported on guides 4 by means of shoes 5, (Fig. 12) formed on its front flange. The elements are assembled by means of an endless chain 6 which is of the same length as the maximum length of the tube when extended. Each shoe 5 is provided in its upper part with a recess in which a segment 6$^a$ of the chain 6 lies, the chain being for this purpose provided with a single link. The segment is held in place by means of a hook 7 that, when closed, prevents raising and longitudinal displacement of the chain, relatively to the elements of the tube. The links consist of two elements and possess therefore, a greater width than the aperture receiving the element 6$^a$. When the tube sections enter each other, the chain is slackened and its links bend downward, permitting the tube sections to slide into each other until the shoes move together. The free extremity of the first element of the tube expands perpendicularly toward the paste supporting means so that its rectangular mouth 8 will be as high as these latter. A to and fro motion is imparted to the telescoping tube 3 by means of an endless chain 9 driven by a driving pulley 10. Said chain has fixed on one of its links, a journal pin 11 (Figs. 10 and 11) which enters a plate 12 loosely mounted on an axle 12$^a$ supported by a bracket 13, which is secured to the first element of the telescoping tube 3. The journal 11 passes through the plate and is held in place by a pin 14. The distance between the axis of the journal 11 and the axis of the plate 12 is equal to half the distance between the longitudinal axis of the upper and lower chain sections and when the journal pin 11 reaches the vertical axis of one of the wheels 19 on which the chain is mounted, the rectilinear motion of the pin ceases and it revolves around the axis of the wheel 19 with the chain, thus rotating the plate 12 on its own axis one-half turn, and resuming immediately afterward its rectilinear motion with the chain in the opposite direction. In this type of drying apparatus, I arrange a fixed suction tube 15 on the side of the paste supporting means, opposite to the air forcing tube, said suction tube being provided with longitudinal apertures 16 through which the air from the drying chamber is sucked into the tube by a fan 17, driven by a pulley 18, and returned into the air forcing tube 3. In the conduits which connect the fan with the air suction and forcing tubes, are provided two ports 20, 21, having sliding doors, by means of which it is possible when desired to change the air circulating in the drying apparatus. In order to change said air, I first close, by means of a sliding door 22, the connection between the suction conduit 15 and fan 17, and open the port 20. I then force into the chamber through the tube 3, air from the exterior. The damp air is driven from the drying chamber through the door by which the carriages are admitted into said chamber.

Figs. 4 and 5 illustrate another constructional form of the drying apparatus described in my prior patent, above referred to, which apparatus is adapted for drying elongated paste, (Naples macaroni) and the like. According to the said form, the suction and forcing tubes are movable and are of the telescoping form previously described. The air forcing tube is situated immediately above the paste supporting means and forces the air vertically downward through the pastes, said tube sliding on guides carried by brackets. illustrated in Fig. 14; said brackets being suitably constructed in order not to interfere with the motion of the telescoping tube. They may be fixed in the ceiling of the drying chamber, while the air suction tube is situated at the bottom below the paste supporting means. Both tubes receive a to and fro motion from a mechanism identical with those before described and so situated that the air inlet and discharge mouths may be always opposite each other and placed one above the other. The air circulation is effected as usually by means of a fan 17 and by reversing the movement of this latter it is possible to reverse the circulation of the air in the drying chamber.

In the drying apparatus illustrated in Figs. 6 and 7, the air forcing tube is placed at the lower part of the chamber 1, underneath the paste supporting means 2, and its mouth is directed in such a manner as to force the air vertically upward. The same air descends laterally of the carriages and is then sucked through the ports 16, provided in the fixed tubes 15, this latter being situated at the lower part of the chamber near the telescoping tube and running all along the chamber.

In the form of the drying apparatus illustrated at Figs. 8 and 9, the air forcing tube is movable and telescoping and is situated at the upper part of the drying chamber so as to direct the air vertically downward, while the air suction tube is fixed in the lower part of the chamber, and provided, as above described, with ports 16 serving to suck the air.

In all three constructional forms above described, the circulation of the air is maintained by means of a fan 17 and the air is changed in the outer tubes of the air circulation, provided with ports 20, 21, having sliding doors, all as described in connection with the first constructional form of the drying apparatus shown at Figs. 1, 2 and 3.

What I claim is:

1. A drying apparatus comprising a telescoping tube, a pair of flexible connecting members the same length as the extended tube and connected to each element of the latter, guides mounted longitudinally of the tube, shoes on each element of the tube slidably mounted on the guides, and an endless drive chain connected with the tube.

2. A drying apparatus comprising a telescoping tube, a pair of flexible connecting members the same length as the extended tube and connected to each element of the latter, guides mounted longitudinally of the tube, shoes on each element of the tube slidably mounted on the guides, an endless drive chain and a rotatable plate connecting one of the tube elements with the drive chain.

3. A drying apparatus comprising a telescoping tube, a pair of chains the same length as the extended tube, shoes on each element of the tube connected with the chains, longitudinal guide rails on which said shoes are slidably mounted, and an endless drive chain connected with the tube.

4. A drying apparatus comprising a telescoping tube, a pair of chains the same length as the extended tube, shoes on each element of the tube connected with the chains, longitudinal guide rails on which said shoes are slidably mounted, an endless drive chain, and a rotatable plate connecting one of the tube elements with the drive chain.

5. A drying apparatus, comprising a chamber, supporting means mounted to hold the material to be dried in a fixed position, a fixed suction tube provided with longitudinal apertures and mounted on one side of the material, and a telescoping tube situated on the opposite side of the latter to direct a drying medium onto the material.

6. A drying apparatus comprising a chamber, supporting means mounted therein to hold the material to be dried in a fixed position, a fixed suction tube rectangular in cross section provided with longitudinal apertures and mounted on one side of the material, and a telescoping tube situated on the opposite side of the latter to direct a drying medium onto the material.

7. A drying apparatus comprising a chamber, supporting means mounted therein to hold the material to be dried in a fixed position, a fixed suction tube provided with longitudinal apertures and mounted on one side of the material, a telescoping tube situated on the opposite side of the latter to direct a drying medium onto the material, and means to reciprocate the mouth end of the telescoping tube longitudinally of the chamber.

8. A drying apparatus, comprising a chamber, supporting means mounted therein to hold the material to be dried, a fixed suction tube provided with longitudinal apertures and mounted below the material, a telescoping tube mounted above the material and having its discharge mouth directed downward, and means to impart a to-and-fro motion to the mouth end of the telescoping tube.

9. A drying apparatus, comprising a chamber, supporting means mounted therein to hold the material to be dried, a fixed suction tube provided with longitudinal apertures and mounted below the material, a telescoping tube mounted above the material and having its discharge mouth directed downward, a pair of flexible members the same length as the extended telescoping tube, shoes on each member of the latter connected with the flexible members, longitudinal guide rails on which said shoes are slidably mounted, an endless drive chain, and a rotatable plate connecting one member of the telescoping tube to the drive chain.

In testimony that I claim the foregoing as my invention, I have signed my name in presence of two subscribing witnesses.

GIOVANNI FALCHI.

Witnesses:
JOCELYN GOUBEYRAN,
PIERO GIANOLIO.

Copies of this patent may be obtained for five cents each, by addressing the "Commissioner of Patents, Washington, D. C."